Patented Sept. 28, 1937

2,094,227

UNITED STATES PATENT OFFICE 2,094,227

MONOBROMOPYRENE AND A PROCESS OF PREPARING IT

Arthur Wolfram, Frankfort-on-the-Main-Rodelheim, and Walther Schnurr, Baden Soden in Taunus, Germany, assignors to General Aniline Works, Inc., New York, N. Y., a corporation of Delaware No Drawing. Application March 18, 1936, Serial No. 69,586. In Germany March 27, 1935

5 Claims. (Cl. 260—161)

The present invention relates to monobromopyrene and to a process of preparing it.

We have found that pyrene can easily be monobrominated by causing bromine, bound to a tertiary base or in dilute form, to act upon pyrene. In such reaction the pyrene may be used in the form of a solution or suspension. The halogen is preferably diluted by dissolving it in about 15 times its weight of a solvent or by conducting it to the reaction mixture by means of an indifferent gas.

The halogen atom stands probably in 3-position according to the following formula:

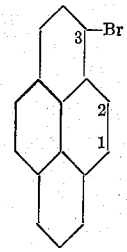

It is exchangeable. The new compound obtained according to this invention is therefore capable of many reactions which, for instance, cannot be accomplished with monochloropyrene. The present invention, therefore, represents a particular technical advance.

The following examples serve to illustrate the invention, but they are not intended to limit it thereto, the parts being by weight:

(1) A solution of 182 parts of bromine in 1000 parts of pyridine is added, while cooling, to a solution of 200 parts of pyrene in 1000 parts of pyridine. As soon as the bromine is completely consumed the mixture is diluted with water. The crude product thus precipitated is purified by distillation under reduced pressure; the monobromopyrene, boiling at 255° C. under a pressure of 7 mm. mercury is obtained with a very good yield in the form of a feebly yellow substance which melts at 95° C. The same results may be obtained by using, instead of pyridine, mixtures of pyridine with other solvents such as with water, glacial acetic acid and the like.

(2) To a solution kept below 0° C. of 200 parts of pyrene in 3000 parts of chloroform there is added drop by drop, while stirring, a solution of 160 parts of bromine in 3000 parts of chloroform. As soon as unchanged bromine can no longer be detected the chloroform is distilled and the residue is purified by distillation under reduced pressure. Monobromopyrene is obtained with a very good yield, as in Example (1). Instead of chloroform there may be used other organic solvents such as carbon tetrachloride, carbon disulfide, glacial acetic acid, trichlorobenzene and the like.

(3) To a fine suspension of 200 parts of pyrene in 1000 parts of water there are added pari passu with the consumption, while quickly stirring, 160 parts of bromine in very dilute solution in water, hydrochloric acid, pyridine or the like. As soon as all of the bromine has been consumed, the whole is filtered with suction, the solid matter is washed until neutral and fractionated. The product obtained has the same properties as that described in Example (1).

(4) A current of air, charged with 160 parts of bromine is conducted at 0° C. into a solution of 200 parts of pyrene in 3000 parts of chloroform. The bromine is quickly absorbed and the further treatment is performed as described in Example (2). Instead of air other indifferent gases may also be used.

(5) 160 parts of bromine dissolved in water, hydrochloric acid or pyridine, are run at 0° C., while strongly stirring, into a solution of 200 parts of pyrene in 3000 parts of chloroform. The further treatment is performed as described in Example (2).

We claim:

1. The process which comprises treating, while cooling, a member of the group consisting of solutions and suspensions of pyrene with a dilute solution of bromine.

2. The process which comprises mixing, while cooling, a solution of pyrene in pyridine with a solution of bromine in pyridine.

3. The process which comprises dropping a solution of bromine in chloroform into a solution of pyrene in chloroform, while cooling to a temperature below 0° C.

4. The process which comprises causing a very diluted solution of bromine in water to run according to the degree of its consumption, while quickly stirring, into a fine suspension of pyrene in water.

5. The compound of the composition

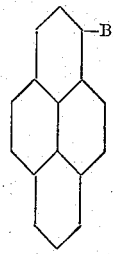

forming a faintly yellow substance melting at 95° C.

ARTHUR WOLFRAM.
WALTHER SCHNURR.